March 1, 1955  N. E. SHOCKEY  2,703,254
FRICTIONALLY SUPPORTED VISOR FOR AUTOMOTIVE VEHICLES
Filed April 13, 1951
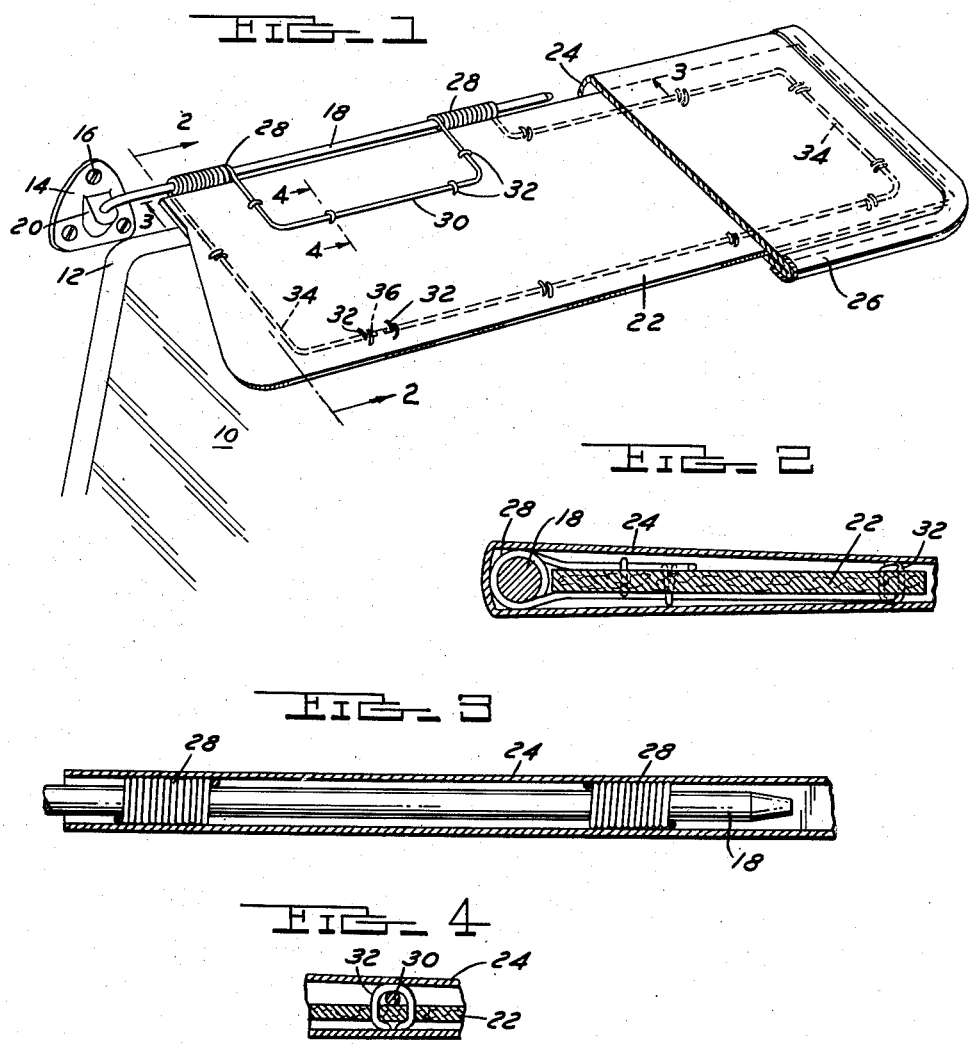
INVENTOR.
NEWTON E. SHOCKEY
BY
Burton & Parker
ATTORNEYS

United States Patent Office 2,703,254
Patented Mar. 1, 1955

2,703,254

FRICTIONALLY SUPPORTED VISOR FOR AUTOMOTIVE VEHICLES

Newton E. Shockey, Highland Park, Mich.

Application April 13, 1951, Serial No. 220,871

1 Claim. (Cl. 296—97)

This invention relates to improvements in visors of the kind commonly termed sun visors or glare shields and which are conventionally used in the interior of automobile bodies being so supported as to be swung from an out of use position above the windshield to an in use position overlapping a part of the windshield and obstructing rays of light therethrough which might interfere with an occupant of the vehicle.

An object is to provide a visor of this character which is simple and inexpensive and which will function to fulfill its purpose easily in response to manipulation by an occupant of the vehicle.

The invention relates particularly to the means whereby the visor blade is supported for adjusted rotation about a pintle or supporting rod and the support is of such a character that the blade may be easily manipulated to any desired adjusted position of rotation and will retain such position against accidental dislocation resulting from the jar of travel of the vehicle over the road.

Visors of this character are in wide use and generally comprise a visor blade pivoted along one linear margin upon a supporting rod for pivotal swinging movement about the rod to adjusted positions of use or non-use. It is conventional also to support the rod so that it may be swung from a position in front of the windshield to a position overlying a side window. Specifically the invention resides in the means whereby the blade is secured to the rod to be held in adjusted position of rotation with respect thereto.

A meritorious feature of this improved visor is the provision of a simple and inexpensive type of hinge structure which is secured to the visor blade and pivoted upon the rod and is of such a character that it grips the rod frictionally and maintains the blade at any position at which it may be adjustably rotated. The hinge structure is so designed that at the time of fabrication of the visor it may be very easily adjusted without any additional cost to grip the rod lightly or very strongly so that its rotation therabout will be accomplished with little effort or it will impose substantial resistance against rotation. It is apparent that depending upon the weight of the visor blade and the character of use it may be desired to vary the frictional grip of the hinge upon the rod.

Other objects, advantages and meritorious features of the invention will appear from the following specification, claim and drawing.

In the drawing:

Fig. 1 is a perspective partly broken away showing a visor embodying this invention mounted upon a fragment of the header about the windshield in a vehicle body;

Fig. 2 is a transverse sectional view taken on the line 2—2 of Fig. 1 and being a section through the visor blade and the covering therefor;

Fig. 3 is a linear sectional view through a visor taken on the line 3—3 of Fig. 1 and broken away at both ends.

Fig. 4 is a fragmentary sectional view taken on the line 4—4 of Fig. 1.

In Fig. 1 a fragment of the interior of a vehicle body is illustrated, the windshield being indicated by the numeral 10 and a header portion by the numeral 12. A visor supporting bracket 14 is shown as secured by screws 16 or the like to the header. This bracket supports a rod or pintle 18. One end of this spindle is shown as mounted within the bracket as at 20. This mounting is conventional and forms no part of the invention but is such as to permit the rod to be swung angularly with respect to the bracket and at least from a position overlying the windshield to a position overlying a side window. The supporting rod 18 carries the visor blade. The visor blade is here shown as comprising a rigid foundation panel 22 which may be formed of fiber board such as "Masonite" or the like. This panel 22 is preferably provided with covering material. This covering material is adapted to cover up the foundation board, the hinge and the rod and to provide a finish for the panel. It is here shown as a flexible ply or layer of material indicated by the numeral 24 and which may be a fabricated sheet comprising an outer finish layer of cloth and an interlayer of fibrous cellulose material adhered to the cloth. It is flexible and therefore adaptable to be bent about the foundation board as shown. It provides a finish. A welt or binding 26 may be stitched about the margin as shown in Fig. 1.

The invention relates to the hinge structure and the hinge comprises a helical spring which is here illustrated as consisting of two helical spring coils 28. The inner ends of these coils 28 are integrally connected together by a portion 30 which is shown as extending over one face of the visor foundation blade 22 and secured thereto by staples 32 or the like. The outer ends of these coils are extended as shown in dotted line at 34 transversely substantially across each end of the visor foundation blade 22 and then linearly substantially thereacross adjacent to its outer edge. The opposite ends of these end portions 34 are shown at 36 held stapled down to the board by the staples 32.

The coils 28 grippingly embrace the rod 18 so that the visor is rotated about the rod against the frictional resistance of the coils thereupon. The tension of these coils may be varied upon the rod by providing coils which fit very closely about the rod or fit a little less snugly. They may be varied in another way by terminating the end portions 30 and 34 so that in the normal state they may be separated by a substantial angle as for example 60, 90 or even 180° as they project away from the coils. When the ends of the coils are then fastened down against the foundation board the coils will be constructed so that they will grip the rod very snugly when placed thereupon.

What I claim is:

In a visor, in combination, a supporting rod, a pair of helical spring coils encircling said rod in linearly spaced relation, said helical spring coils having first extensions on their inner adjacent end portions formed to define a first loop, said helical spring coils having second extensions on their outer end portions formed to define a second loop, said first loop and said second loop when unrestrained having a predetermined angle between them in accordance with the frictional resistance desired, a visor blade, means for holding said first loop adjacent one side of said visor blade, and means for holding said second loop adjacent the other side of said visor blade in substantial parallelism with said first loop to constrict said spring coils grippingly about said rod but resiliently rotatable thereabout whereby the blade is adapted to be held at adjusted positions of rotation about the rod.

References Cited in the file of this patent

UNITED STATES PATENTS

| | | |
|---|---|---|
| 629,858 | Hollenbeck | Aug. 1, 1899 |
| 714,384 | Luppert | Nov. 25, 1902 |
| 761,517 | Luppert | May 31, 1904 |
| 1,436,765 | Holmwood | Nov. 28, 1922 |
| 2,260,482 | Roberts | Oct. 28, 1941 |